US012658449B2

(12) United States Patent
Mei et al.

(10) Patent No.: US 12,658,449 B2
(45) Date of Patent: Jun. 16, 2026

(54) ELECTRODE PLATE AND LITHIUM-ION BATTERY

(71) Applicant: BYD COMPANY LIMITED, Shenzhen (CN)

(72) Inventors: Riguo Mei, Shenzhen (CN); Xiaoya Chang, Shenzhen (CN); Zhengjiao Liu, Shenzhen (CN); Ziwen Wu, Shenzhen (CN); Yi Pan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 605 days.

(21) Appl. No.: 18/174,795

(22) Filed: Feb. 27, 2023

(65) Prior Publication Data

US 2023/0223547 A1     Jul. 13, 2023

Related U.S. Application Data

(63) Continuation of application No. PCT/CN2021/114867, filed on Aug. 27, 2021.

(30) Foreign Application Priority Data

Aug. 27, 2020     (CN) .......................... 202010879566.1

(51) Int. Cl.
*H01M 4/62*          (2006.01)
*H01M 4/134*        (2010.01)
*H01M 10/0525*    (2010.01)

(52) U.S. Cl.
CPC ........... *H01M 4/628* (2013.01); *H01M 4/134* (2013.01); *H01M 10/0525* (2013.01)

(58) Field of Classification Search
None
See application file for complete search history.

(56) References Cited

U.S. PATENT DOCUMENTS 4,222,783 A * 9/1980 Atsumi .................. H01C 7/025
                                                                        252/570
9,281,526 B1     3/2016 Liu et al.
(Continued)

FOREIGN PATENT DOCUMENTS

CN          107658496 A      2/2018
CN          108539124 A      9/2018
(Continued)

OTHER PUBLICATIONS

English translation of International Search Report from PCT/CN2021/114867 dated Nov. 26, 2021 (3 pages).

*Primary Examiner* — Wyatt P McConnell
(74) *Attorney, Agent, or Firm* — Calfee, Halter & Griswold LLP

(57)          ABSTRACT

Provided are an electrode plate and a lithium-ion battery, the electrode plate includes a current collector layer, a semiconductor layer and an alkali metal replenishing layer. The semiconductor layer is disposed on at least one surface of the current collector layer. The alkali metal replenishing layer is a lithium-replenishing agent layer or a sodium-replenishing agent layer. The alkali metal replenishing layer is arranged on a side of the semiconductor layer far away from the current collector layer.

20 Claims, 3 Drawing Sheets

(56)                    References Cited

U.S. PATENT DOCUMENTS

2014/0178753 A1 *   6/2014   Chu ........................ H01M 4/62
                                                429/211
2019/0237824 A1 *   8/2019   Jin ...................... H01M 50/553
2021/0367280 A1 *   11/2021   Jin .................... H01M 10/0525

FOREIGN PATENT DOCUMENTS

| CN | 108878775 | A | 11/2018 |
|----|-----------|---|---------|
| CN | 109728365 | A | 5/2019 |
| CN | 110048079 | A | 7/2019 |
| CN | 110459808 | A | 11/2019 |
| CN | 111081982 | A | 4/2020 |
| CN | 111525095 | A | 8/2020 |
| CN | 111560595 | A | 8/2020 |
| CN | 107845829 | B | 6/2021 |
| CN | 108539124 | B | 7/2021 |

* cited by examiner

ELECTRODE PLATE AND LITHIUM-ION BATTERY

CROSS-REFERENCE TO RELATED APPLICATIONS

The present disclosure is a bypass continuation of PCT International Application No. PCT/CN2021/114867, filed on Aug. 27, 2021, which claims priority to and benefits of Chinese Patent Application No. 202010879566.1, filed on Aug. 27, 2020. The entire contents of the above-referenced applications are incorporated herein by reference.

FIELD

The present disclosure relates to the field of battery device technologies, and specifically, the present disclosure relates to an electrode plate and a lithium-ion battery.

BACKGROUND

In recent years, with the continuous improvement of people's awareness of environmental protection, electric vehicles have gradually replaced fuel vehicles as the object sought after by users. With the continuous upgrading of electric vehicles, lithium-ion batteries, as the main power components of electric vehicles, are required to meet higher requirements on the performance such as energy density and cycle life.

During the first charge and discharge process of a lithium-ion battery, a solid electrolyte interface film (SEI) formed at the negative electrode consumes active lithium ions, resulting in a significant reduction in the capacity of the lithium-ion battery. The Coulombic efficiency of the first charge and discharge of lithium-ion batteries with graphite as the negative electrode is about 92-94%, and the Coulombic efficiency of the first charge and discharge of lithium-ion batteries with silicon-carbon as the negative electrode is only 75-85%.

At present, the capacity of lithium-ion batteries is mainly improved by lithium pre-replenishing technology, Specifically, a lithium-replenishing agent may be dispersed or added to an electrode plate to prepare a battery, and the battery may be activated by cyclic charging and discharging, so that active lithium ions carried by the lithium-replenishing agent added to the electrode plate can be released, thereby making up for the loss of active lithium due to the film formation of the lithium-ion battery and improving the capacity of the lithium-ion battery. However, this lithium replenishing method is generally one-time lithium replenishment, and cannot effectively control the lithium replenishing process.

SUMMARY

Embodiments of the present disclosure provide an electrode plate and a lithium-ion battery to solve the problem in the related art that the lithium replenishing process of the lithium-ion battery cannot be effectively controlled.

To solve the above technical problems, the following technical solutions are adopted in the embodiments of the present disclosure:

In a first aspect, an embodiment of the present disclosure provides an electrode plate, including:

a current collector layer;

a semiconductor layer, where the semiconductor layer is disposed on at least one surface of the current collector layer; and an alkali metal replenishing layer, where the alkali metal replenishing layer is a lithium-replenishing agent layer or a sodium-replenishing agent layer, and the alkali metal replenishing layer is arranged on a side of the semiconductor layer far away from the current collector layer.

According to some embodiments of the present disclosure, a thickness of the alkali metal replenishing layer ranges from 50 μm to 300 μm.

According to some embodiments of the present disclosure, the alkali metal replenishing layer is a lithium-replenishing agent layer, and the lithium-replenishing agent layer is a negative electrode lithium-replenishing agent layer.

According to some embodiments of the present disclosure, the negative electrode lithium-replenishing agent layer includes at least one of metal lithium, lithium silicon alloy, lithium aluminum alloy, lithium boron alloy and lithium magnesium alloy.

According to some embodiments of the present disclosure, the alkali metal replenishing layer is a lithium-replenishing agent layer, and the lithium-replenishing agent layer is a positive electrode lithium-replenishing agent layer.

According to some embodiments of the present disclosure, the positive electrode lithium-replenishing agent layer includes at least one of lithium oxide, lithium ferrite, lithium cobaltate and lithium nickel oxide.

According to some embodiments of the present disclosure, a surface resistance of the semiconductor layer ranges from $10^{-3}$ mΩ·m² to $10^5$ mΩ·m².

According to some embodiments of the present disclosure, a thickness of the semiconductor layer ranges from 100 nm to 500 nm.

In a second aspect, an embodiment of the present disclosure provides a lithium-ion battery, which includes a positive electrode plate, a negative electrode plate and the electrode plate in the first aspect, where the alkali metal replenishing layer is a lithium-replenishing agent layer; and the positive electrode plate and the negative electrode plate are separated from each other by a separator, and at least one electrode plate is separated from the positive electrode plate and/or the negative electrode plate by the separator.

According to some embodiments of the present disclosure, the electrode plate is a negative electrode lithium-replenishing electrode plate, the electrode plate includes a lithium-replenishing tab extending from the current collector layer, the negative electrode plate includes a negative tab, and the lithium-replenishing tab is connected with the negative tab.

According to some embodiments of the present disclosure, the electrode plate is a positive electrode lithium-replenishing electrode plate, the electrode plate includes a lithium-replenishing tab extending from the current collector layer, the positive electrode plate includes a positive tab, and the lithium-replenishing tab is connected with the positive tab.

The technical solutions provided in the embodiments of the present disclosure can achieve the following beneficial effects:

The embodiments of the present disclosure provide an electrode plate, including a current collector layer, a semiconductor layer, and an alkali metal replenishing layer. The semiconductor layer is disposed on at least one surface of the current collector layer. The alkali metal replenishing layer is

3 a lithium-replenishing agent layer or a sodium-replenishing agent layer. The alkali metal replenishing layer is arranged on a side of the semiconductor layer far away from the current collector layer. According to the electrode plate provided by the embodiments of the present disclosure, the semiconductor layer is disposed between the current collector layer and the alkali metal replenishing layer, so that on/off of the semiconductor layer can be flexibly controlled by adjusting a trigger condition of the semiconductor layer, thereby improving the controllability of the electrode plate.

Additional aspects and advantages of the present disclosure will be partly given in and partly apparent from the description below, or understood through practice of the present disclosure.

BRIEF DESCRIPTION OF THE DRAWINGS

The accompanying drawings constituting a part of the present disclosure are provided for further illustrating the present disclosure. The illustrative embodiments of the present disclosure and the description thereof are used for explaining the present disclosure and are not intended to constitute an undue limitation on the present disclosure. In the drawings.

LIST OF REFERENCE NUMERALS

1—electrode plate; 101—current collector layer; 102—semiconductor layer; 103—alkali metal replenishing layer; 2—positive electrode plate; 3—negative electrode plate; 4—separator.

DETAILED DESCRIPTION

To make the object, technical solutions and advantages of the present disclosure clearer, the technical solutions of the present disclosure will be clearly and completely described in the following with reference to the specific embodiments and the corresponding drawings of the present disclosure. Apparently, the embodiments described are some preferred embodiments, rather than all of the embodiments of the present disclosure. All other embodiments obtained by a person of ordinary skill in the art based on the embodiments of the present disclosure without creative efforts shall fall within the protection scope of the present disclosure.

In the specification and claims of the present disclosure, the terms "first", "second" or the like are intended to distinguish between similar objects but do not indicate a particular order or sequence. It is to be understood that the data termed in such a way are interchangeable in appropriate circumstances, so that the embodiments of the present disclosure can be implemented in orders other than the order illustrated or described herein. The objects distinguished by terms such as "first", "second", etc. are usually of one class, and such terms are not intended to limit the number of objects. For example, a "first object" may mean one or more first objects. Further, "and/or" in the description and the claims indicate at least one of the associated objects. The character "/" generally indicates an "or" relation between the associated objects.

The technical solutions disclosed in the embodiments of the present disclosure will be described in detail with reference to the accompanying drawings.

Figure 1:
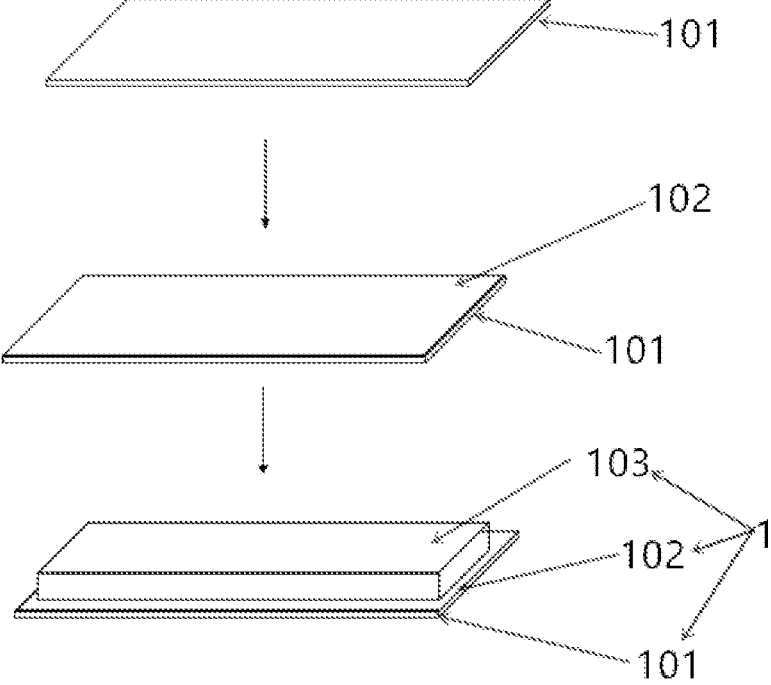
FIG. 1 is a schematic structural diagram of an electrode plate according to an embodiment of the present disclosure.

According to an aspect of the present disclosure, referring to FIG. 1, an embodiment of the present disclosure provides an electrode plate 1, including: a current collector layer 101, a semiconductor layer 102 and an alkali metal replenishing layer 103. The semiconductor layer 102 is disposed on at least one surface of the current collector layer 101. Specifically, the semiconductor layer 102 may be disposed on a surface of one side of the current collector layer 101, or the semiconductor layer 102 may be disposed on a surface of each of two sides of the current collector layer 101. The alkali metal replenishing layer 103 is a lithium-replenishing agent layer or a sodium-replenishing agent layer. The alkali metal replenishing layer 103 is arranged on a side of the semiconductor layer 102 far away from the current collector layer 101. The semiconductor layer 102 has a high resistivity in a normal state. There is no electrical connection between the current collector layer 101 and the alkali metal replenishing layer 103. When the semiconductor layer 102 is triggered under high temperature or high pressure conditions, the resistance of the semiconductor layer 102 is significantly reduced, so that the current collector layer 101 and the alkali metal replenishing layer 103 are electrically connected to each other. In this case, a path can be formed between the current collector layer 101 and the alkali metal replenishing layer 103. After an active alkali metal in the alkali metal replenishing layer 103 is released, the alkali metal needs to be replenished for the positive electrode plate or/and the negative electrode plate, and the replenishment rate and the replenishment amount of the alkali metal replenishing layer 103 can be flexibly controlled by adjusting the trigger condition of the semiconductor layer 102.

By disposing the semiconductor layer 102 between the current collector layer 101 and the alkali metal replenishing layer 103, the electrode plate 1 provided in the embodiments of the present disclosure avoids the reaction caused by direct contact between the alkali metal replenishing layer 103 and the electrode material of the battery when the electrode plate 1 is compacted. More importantly, the semiconductor layer 102 can flexibly control on/off of the semiconductor layer 102 by adjusting its trigger condition, and the release rate and release amount of active ions in the electrode plate 1 are controlled by controlling a system on a chip (SOC) state of the battery, temperature or internal pressure of the battery, so as to control the replenishment rate and replenishment amount of the electrode plate 1, thereby improving the flexibility of the electrode plate 1.

In addition, the flexible on/off of the semiconductor layer 102 realizes a controllable lithium or sodium replenishment process to a certain extent, and active lithium or active sodium can be released to a lithium-ion battery or sodium-ion battery in stages and batches as required, to make up for the loss of active alkali metal of the battery in time, thereby greatly improving the cycle performance of the battery. As such, triggering of the semiconductor layer 102 may include a first trigger stage and a second trigger stage. The first trigger stage and the second trigger stage not only include only two trigger stages, but the semiconductor layer 102 may also include a plurality of replenishment stages, which can be realized as long as the electrode plate 1 still contains an active alkali metal and the semiconductor layer 102 is on.

According to an embodiment of the present disclosure, a thickness of the alkali metal replenishing layer 103 ranges from 50 μm to 300 μm. According to a specific embodiment of the present disclosure, the thickness of the alkali metal replenishing layer 103 ranges from 125 μm to 200 μm.

Specifically, the thickness of the alkali metal replenishing layer 103 is directly related to the replenishment times and the replenishment amount of the alkali metal on the electrode plate 1. The alkali metal replenishing layer 103 having the above thickness can meet the requirement of the replenishment amount of the alkali metal on the positive electrode plate or the negative electrode plate of the battery and avoid a possible waste and occupation of too much space of the battery.

According to an embodiment of the present disclosure, the alkali metal replenishing layer 103 is a lithium-supplementing agent layer, and the lithium-supplementing agent layer is a negative electrode lithium-supplementing agent layer.

Specifically, when the alkali metal replenishing layer 103 is a negative electrode lithium-replenishing agent layer, the negative lithium-replenishing agent layer may include at least one of metal lithium, lithium silicon alloy, lithium aluminum alloy, lithium boron alloy and lithium magnesium alloy. The metal lithium may be an ultra-thin lithium strip, stabilized metal lithium powder or lithium sheet. In this case, the current collector layer 101 may be a copper foil, and the semiconductor layer 102 is disposed between the negative electrode lithium-replenishing agent layer and the copper foil. The electrode plate 1 may be connected with the negative electrode plate of the lithium-ion battery, and when the semiconductor layer 102 is turned on, the electrode plate 1 can replenish lithium for the negative electrode plate.

According to another embodiment of the present disclosure, the alkali metal replenishing layer 103 is a lithium-supplementing agent layer, and the lithium-supplementing agent layer is a positive electrode lithium-supplementing agent layer.

Specifically, when the alkali metal replenishing layer 103 is a positive electrode lithium-replenishing agent layer, the positive lithium-replenishing agent layer may include at least one of lithium oxide, lithium ferrite, lithium cobaltate and lithium nickel oxide. In this case, the current collector layer 101 may be an aluminum foil, and the semiconductor layer 102 is disposed between the positive electrode lithium-replenishing agent layer and the aluminum foil. The electrode plate 1 may be connected with the positive electrode plate of the lithium-ion battery, and when the semiconductor layer 102 is turned on, the electrode plate 1 can replenish lithium for the positive electrode plate.

According to still another embodiment of the present disclosure, a surface resistance of the semiconductor layer 102 ranges from $10^{-3}$ mΩ·m$^2$ to $10^5$ mΩ·m$^2$. Therefore, the flexible on/off of the semiconductor layer 102 can be further ensured, and controllable lithium or sodium replenishment can be realized.

Specifically, the semiconductor layer 102 may be a thermo-sensitive semiconductor which may be obtained from one or a plurality of oxides including ZnO, CuO, NiO, $Al_2O_3$, $Fe_2O_3$, $Mn_3O_4$ and $Co_3O_4$. When the semiconductor layer 102 is a thermo-sensitive semiconductor, the on/off of the semiconductor layer 102 may be controlled by controlling the temperature of the semiconductor layer 102. Specifically, when the semiconductor layer 102 is at a low temperature or at room temperature, the surface resistance of the semiconductor layer 102 is large, so that the current collector layer 101 and the alkali metal replenishing layer 103 can be separated. When the temperature of the semiconductor layer 102 is high, the surface resistance of the semiconductor layer 102 is significantly reduced, and the current collector layer 101 and the alkali metal replenishing layer 103 are electrically connected, so that the replenishment process of the electrode plate 1 can be realized, and the function of flexibly controlling the replenishment for the electrode plate 1 can be achieved. When the surface resistance of the semiconductor layer 102 is too high at a low temperature or at room temperature, it is difficult for the semiconductor layer 102 to be turned on after the temperature of the semiconductor layer 102 is raised, making it inconvenient to realize the replenishment process of the electrode plate 1. When the surface resistance of the semiconductor layer 102 is too small at a low temperature or at room temperature, a large self-discharge current may be generated, and the function of effectively controlling on/off of the semiconductor layer 102 cannot be achieved. If the surface resistance of the semiconductor layer 102 is too small after the temperature rise, the turning on of the semiconductor layer 102 does not require a significant temperature rise process, and consequently the semiconductor layer 102 may remain on for a long time, failing to achieve the flexible control of replenishment for the electrode plate 1. If the surface resistance of the semiconductor layer 102 is too large after the temperature rise, it is difficult for the semiconductor layer 102 to be turned on after the temperature of the semiconductor layer 102 is raised, making it inconvenient to realize the replenishment process of the electrode plate 1.

In a specific implementation, the surface resistance of a coating of the semiconductor layer 102 is maintained at $10^{-3}$ mΩ·m$^2$ to $10^5$ mΩ·m$^2$ by adjusting the material composition of the semiconductor layer 102 and the thickness of the coating of the semiconductor layer 102. When the semiconductor layer 102 is off at room temperature, the surface resistance of the semiconductor layer 102 may reach $10^5$ mΩ·m$^2$, electrons on the two sides of the semiconductor layer 102 are basically insulated, and the leakage current is smaller than 0.1 μA/m$^2$. When the semiconductor layer 102 is on at a high temperature, for example, when the internal temperature of the lithium-ion battery is 60° C., the surface resistance of the coating of the semiconductor layer 102 is smaller than $10^{-3}$ mΩ·m$^2$. In this case, electrons on both sides of the coating of the semiconductor layer 102 are connected, and the electrode plate 1 can replenish lithium or sodium for the electrode plate of the battery. In addition, the semiconductor layer 102 may also be a pressure-sensitive semiconductor, a pressure control component is disposed inside the lithium-ion battery, and the pressure control component can control on/off of the pressure-sensitive semiconductor.

According to still another embodiment of the present disclosure, a thickness of the semiconductor layer 102 ranges from 100 nm to 500 nm. According to a specific embodiment of the present disclosure, the thickness of the semiconductor layer 102 ranges from 180 nm to 350 nm.

Specifically, when the semiconductor layer 102 is not triggered to turn on, that is, when the semiconductor layer 102 is off, the resistance of the semiconductor layer 102 is very high, so the electron exchange between the current collector layer 101 and the alkali metal replenishing layer 103 can be effectively blocked by the semiconductor layer 102 which has a thickness of several hundred nanometers. A too thick semiconductor layer 102 not only causes a waste, but also occupies much of the limited space inside the battery.

Figure 2:
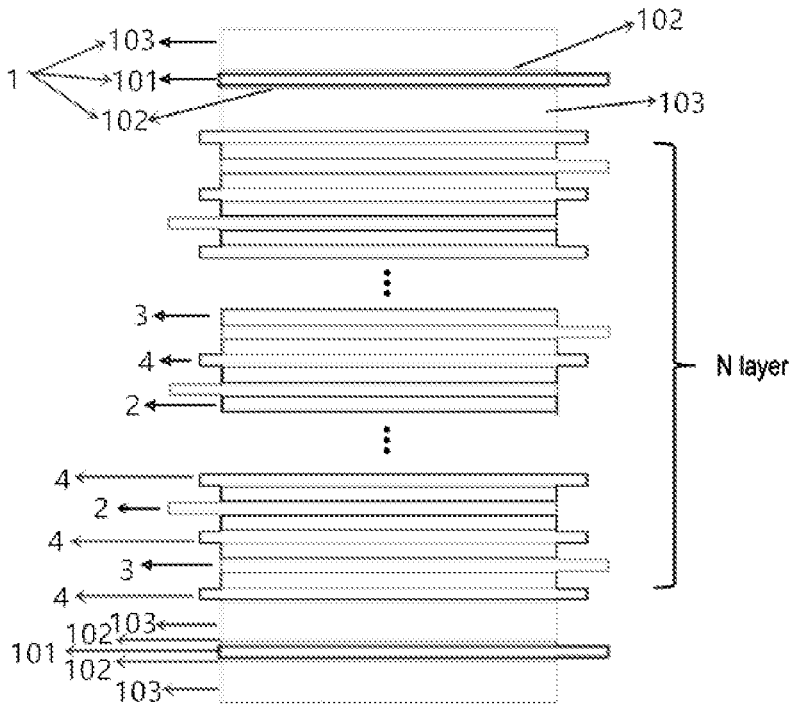
FIG. 2 is a schematic structural diagram of a lithium-ion battery according to an embodiment of the present disclosure.

According to another aspect of the present disclosure, referring to FIG. 2, an embodiment of the present disclosure also provides a lithium-ion battery, which includes a positive electrode plate 2, a negative electrode plate 3 and the electrode plate 1. The alkali metal replenishing layer 103 of the electrode plate 1 is a lithium-replenishing agent layer. The positive electrode plate 2 and the negative electrode plate 3 are separated from each other by a separator 4, and at least one electrode plate 1 is separated from the positive electrode plate 2 and/or the negative electrode plate 3 by the separator 4.

Specifically, by disposing the semiconductor layer 102 between the current collector layer 101 and the alkali metal replenishing layer 103, the electrode plate 1 avoids heat generation due to the reaction between the alkali metal replenishing layer 103 and the negative electrode material of the battery when the electrode plate 1 is compacted. In addition, after electrolyte solution filling to the lithium-ion battery, the alkali metal replenishing layer 103 does not react violently with the negative electrode material of the battery to produce SEI film residues, thereby reducing the risk of lithium plating in the lithium-ion battery. In addition, when the alkali metal replenishing layer 103 of the electrode plate 1 is a sodium-replenishing agent layer, the positive electrode plate 2, the negative electrode plate 3 and the electrode plate 1 may be prepared into a sodium-ion battery based on a structure similar to that of the lithium-ion battery.

More importantly, the flexible on/off of the semiconductor layer 102 realizes a controllable pre-lithiation process to a certain extent, and active lithium can be released to the lithium-ion battery in stages and batches as required, so as to make up for the loss of active lithium of the lithium-ion battery in time, thereby greatly improving the cycle performance of the lithium-ion battery and prolonging the service life of the lithium-ion battery.

According to an embodiment of the present disclosure, the electrode plate 1 is a negative electrode lithium-replenishing electrode plate, the electrode plate 1 includes a lithium-replenishing tab extending from the current collector layer 101, the negative electrode plate 3 includes a negative tab, and the lithium-replenishing tab is connected with the negative tab.

Specifically, the number of the electrode plates 1 may be one, two, three or more, and the number of the negative electrode plates 3 may also be one, two, three or more. The lithium-replenishing tabs of the plurality of the electrode plates 1 are connected with the negative tabs of the plurality of the negative electrode plates 3. When the semiconductor layer 102 is turned on, a path is formed between the electrode plate 1 and the negative electrode plate 3, and the electrode plate 1 can replenish lithium to the negative electrode plate 3. When the negative electrode plate 3 does not require lithium replenishment, the lithium replenishment path can be disconnected by turning off the semiconductor layer 102.

In a specific implementation, referring to FIG. 2, in a lithium-ion battery, the number of the electrode plates 1 is two, the numbers of the positive electrode plates 2 and the negative electrode plates 3 are plural, and the plurality of the positive and negative electrode plates 2 and 3 are alternately disposed and separated by the separator 4. The upper and lower sides of the lithium-ion battery are each provided with an electrode plate 1 close to the negative electrode plate 3. The negative electrode plate 3 and the electrode plate 1 are separated by the separator 4. The lithium-replenishing tabs of the two electrode plates 1 are connected with negative tabs of the plurality of negative electrode plates 3. Whereby, the electrode plates 1 can replenish lithium to the negative electrode plates 3.

According to another embodiment of the present disclosure, the electrode plate 1 is a positive electrode lithium-replenishing electrode plate, the electrode plate 1 includes a lithium-replenishing tab extending from the current collector layer 101, the positive electrode plate 2 includes a positive tab, and the lithium-replenishing tab is connected with the positive tab.

Specifically, the number of the electrode plates 1 may be one, two, three or more, and the number of the positive electrode plates 2 may also be one, two, three or more. The lithium-replenishing tabs of the plurality of the electrode plates 1 are connected with the positive tabs of the plurality of the positive electrode plates 2. When the semiconductor layer 102 is turned on, a path is formed between the electrode plate 1 and the positive electrode plate 2, and the electrode plate 1 can replenish lithium to the positive electrode plate 2. When the positive electrode plate 2 does not require lithium replenishment, the lithium replenishment path can be disconnected by turning off the semiconductor layer 102.

The electrode plate and the lithium-ion battery including the same are described by the following specific examples:

Electrode Plate Example 1

The electrode plate includes:

a copper foil as a current collector; a dense semiconductor layer disposed on a surface of copper foil, where the semiconductor layer is of a thermo-sensitive material, has a thickness of 100 nm, and has the following composition (mass ratio) of $ZnO:NiO:Al_2O_3:Fe_2O_3=0.3:0.3:0.3:0.1$, a surface resistance of the semiconductor layer at 25° C. is $2.3*10^4$ $m\Omega\cdot m^2$, and a surface resistance of the semiconductor layer at 60° C. is $2.6*10^{-3}$ $m\Omega\cdot m^2$; and an alkali metal replenishing layer disposed on a side of the semiconductor layer far away from the copper foil, where a thickness of the alkali metal replenishing layer is 50 μm.

Electrode Plate Example 2

The electrode plate includes:

a copper foil as a current collector; a dense semiconductor layer disposed on a surface of copper foil, where the semiconductor layer is of a thermo-sensitive material, has a thickness of 500 nm, and has the following composition (mass ratio) of $ZnO:NiO:Al_2O_3:Fe_2O_3=0.4:0.4:0.1:0.1$, a surface resistance of the semiconductor layer at 25° C. is $9*10^4$ $m\Omega\cdot m^2$, and a surface resistance of the semiconductor layer at 60° C. is $1.6*10^{-2}$ $m\Omega\cdot m^2$; and an alkali metal replenishing layer disposed on a side of the semiconductor layer far away from the copper foil, where a thickness of the alkali metal replenishing layer is 300 μm.

Electrode Plate Example 3

The electrode plate includes:

a copper foil as a current collector; a dense semiconductor layer disposed on a surface of copper foil, where the semiconductor layer is of a thermo-sensitive material, has a thickness of 180 nm, and has the following composition (mass ratio) of $ZnO:NiO:Al_2O_3=0.4:0.4:0.2$, a surface resistance of the semiconductor layer at 25° C. is $6.3*10^4$ $m\Omega\cdot m^2$, and a surface resistance of the semiconductor layer at 60° C. is $1.0*10^{-3}$ $m\Omega\cdot m^2$; and an alkali metal replenishing layer disposed on a side of the semiconductor layer far away from the copper foil, where a thickness of the alkali metal replenishing layer is 125 μm.

Electrode Plate Example 4

The electrode plate includes:
a copper foil as a current collector; a dense semiconductor layer disposed on a surface of copper foil, where the semiconductor layer is of a thermo-sensitive material, has a thickness pf 350 nm, and has the following composition (mass ratio) of $ZnO:NiO:Al_2O_3:Fe_2O_3=0.25:0.25:0.25:0.25$, a surface resistance of the semiconductor layer at 25° C. is $7.8*10^4$ $m\Omega\cdot m^2$, and a surface resistance of the semiconductor layer at 60° C. is $2.6*10^{-3}$ $m\Omega\cdot m^2$; and an alkali metal replenishing layer disposed on a side of the semiconductor layer far away from the copper foil, where a thickness of the alkali metal replenishing layer is 200 μm.

Electrode Plate Example 5

The electrode plate includes:
a copper foil as a current collector; a dense semiconductor layer disposed on a surface of copper foil, where the semiconductor layer is of a thermo-sensitive material, has a thickness of 250 nm, and has the following composition (mass ratio) of $ZnO:NiO:Al_2O_3:Fe_2O_3=0.2:0.3:0.2:0.3$, a surface resistance of the semiconductor layer at 25° C. is $8.5*10^4$ $m\Omega\cdot m^2$, and a surface resistance of the semiconductor layer at 60° C. is $1.7*10^{-3}$ $m\Omega\cdot m^2$; and an alkali metal replenishing layer disposed on a side of the semiconductor layer far away from the copper foil, where a thickness of the alkali metal replenishing layer is 200 μm.

Electrode Plate Example 6

The electrode plate includes:
a copper foil as a current collector; a dense semiconductor layer disposed on a surface of copper foil, where the semiconductor layer is of a thermo-sensitive material, has a thickness of 50 nm, and has the following composition (mass ratio) of $ZnO:NiO:Al_2O_3:Fe_2O_3=0.2:0.3:0.2:0.3$, a surface resistance of the semiconductor layer at 25° C. is $4.5*10^3$ $m\Omega\cdot m^2$, and a surface resistance of the semiconductor layer at 60° C. is $3.9*10^{-4}$ $m\Omega\cdot m^2$; and an alkali metal replenishing layer disposed on a side of the semiconductor layer far away from the copper foil, where a thickness of the alkali metal replenishing layer is 50 μm.

Electrode Plate Example 7

The electrode plate includes:
a copper foil as a current collector; a dense semiconductor layer disposed on a surface of copper foil, where the semiconductor layer is of a thermo-sensitive material, has a thickness of 100 nm, and has the following composition (mass ratio) of $ZnO:NiO:Al_2O_3:Fe_2O_3=0.2:0.3:0.2:0.3$, a surface resistance of the semiconductor layer at 25° C. is $3.2*10^4$ $m\Omega\cdot m^2$, and a surface resistance of the semiconductor layer at 60° C. is $6.8*10^{-3}$ $m\Omega\cdot m^2$; and an alkali metal replenishing layer disposed on a side of the semiconductor layer far away from the copper foil, where a thickness of the alkali metal replenishing layer is 30 μm.

Electrode Plate Example 8

The electrode plate includes:
a copper foil as a current collector; a dense semiconductor layer disposed on a surface of copper foil, where the semiconductor layer is of a thermo-sensitive material, has a thickness of 600 nm, and has the following composition (mass ratio) of $ZnO:NiO:Al_2O_3:Fe_2O_3=0.2:0.3:0.2:0.3$, a surface resistance of the semiconductor layer at 25° C. is $9.2*10^4$ $m\Omega\cdot m^2$, and a surface resistance of the semiconductor layer at 60° C. is $8.8*10^{-3}$ $m\Omega\cdot m^2$; and an alkali metal replenishing layer disposed on a side of the semiconductor layer far away from the copper foil, where a thickness of the alkali metal replenishing layer is 50 μm.

Electrode Plate Example 9

The electrode plate includes:
a copper foil as a current collector; a dense semiconductor layer disposed on a surface of copper foil, where the semiconductor layer is of a thermo-sensitive material, has a thickness of 100 nm, and has the following composition (mass ratio) of $ZnO:NiO:Al_2O_3:Fe_2O_3=0.2:0.3:0.2:0.3$, a surface resistance of the semiconductor layer at 25° C. is $2.4*10^4$ $m\Omega\cdot m^2$, and a surface resistance of the semiconductor layer at 60° C. is $1.2*10^{-3}$ $m\Omega\cdot m^2$; and an alkali metal replenishing layer disposed on a side of the semiconductor layer far away from the copper foil, where a thickness of the alkali metal replenishing layer is 400

Electrode Plate Comparative Example 1

A conventional lithium strip has a thickness of 50 μm.

In the present disclosure, the electrode plates of the above-mentioned Examples 1 to 9 are added as independent electrodes to a laminated cell of a lithium-ion battery. The positive electrode of the laminated cell is lithium iron phosphate, with a positive electrode area density of 400 $g/m^2$ and a compacted density of 2.60 $g/m^3$, and the negative electrode is natural graphite, with a negative electrode area density of 205 $g/m^2$ and a compacted density of 1.55 $g/m^3$. The number of laminated layers (number of positive and negative electrode plate pairs) is 30. Lithium-ion battery examples 1 to 9 are obtained. The conventional lithium strip in Comparative Example 1 is directly rolled onto the negative electrode of the laminated cell of the lithium-ion battery as a lithium-ion battery comparative example 1, and the lithium-ion battery without the addition of an electrode plate is used as lithium-ion battery comparative example 2. The activation and testing process of the lithium-ion batteries are carried out. The details are as follows:

Activation process: The lithium-ion battery is formed and capacity graded at room temperature, and then the SOC state of the lithium-ion battery is adjusted to 0%, at which time the open circuit voltage of the lithium-ion battery is in the range of 2.45 V to 2.55 V. Then the lithium-ion battery is heated to 45° C. and then infiltrated at a high temperature for 12 h, at which time, the semiconductor layer of the electrode plate conducts electricity, and a path is formed between the alkali metal replenishing layer and the current collector layer. In this case, active lithium of the alkali metal replenishing layer is pull away from the electrode plate and intercalated in the graphite negative electrode of the lithium-ion battery. The lithium replenishing amount of the electrode plate is controlled and adjusted by monitoring the voltage of the lithium-ion battery. When the open circuit voltage of the lithium-ion battery rises by 0.2 V, the lithium-ion battery can be cooled to 25° C. to complete the activation process. The activation process generally takes about 8 h-12 h (where comparative examples 1 and 2 do not need the activation process).

Capacity test: At room temperature, the activated lithium-ion battery is charged to 3.8 V at a 0.1 C constant current and constant voltage and stood for 30 min, and then discharged to 2.0 V at a 0.1 C constant current and stood for 30 min. The above process is repeated three times to obtain a stable discharge capacity.

Cycle test: At room temperature, the activated lithium-ion battery is charged to 3.8 V at a 0.33 C constant current and constant voltage and stood for 30 min, and then discharged to 2.0 V at a 0.33 C constant current and stood for 30 min. The above process is repeated 2000 times. The capacity test is carried out once every 100 cycles.

Storage test: The activated lithium-ion battery is charged to 100% SOC and stored at room temperature, and the capacity is tested every other week.

Table 1 gives the test results of the lithium-ion batteries from Example 1 to Example 9 and Comparative Example 1 and Comparative Example 2. As can be seen from Table 1, the first charge and discharge capacity of the lithium-ion batteries provided by Example 1 to Example 5 of the present disclosure can reach up to 150 mAh/g, the capacity retention rate can still reach up to 88.3% after 2000 charge and discharge cycles, and the capacity retention rate can still reach up to 98.4 after 26 weeks of storage. Moreover, the capacity retention rate of the lithium-ion battery obtained in Example 4 can even reach up to 90% after 2000 charge and discharge cycles, and the capacity retention rate can reach about 100% after 26 weeks of storage, indicating that the capacity of the lithium-ion battery basically does not decrease after long-term storage.

When the thickness of the semiconductor layer or the thickness of the alkali metal replenishing layer in Example 6 to Example 9 is lower than or higher than the range in the preferred embodiments of the present disclosure, the first charge and discharge capacity of the lithium-ion battery can only reach 150.6 mAh/g, but can still be maintained at 143.2 mAh/g or more, the capacity retention rate after 2000 charge and discharge cycles ranges 80% to 85%, and the capacity retention rate after 26 weeks of storage ranges 93% to 96%. The capacity and retention rate, though lower than those of the lithium-ion batteries provided in Examples 1 to 5 of the present disclosure, are still high.

The first charge and discharge capacities of lithium-ion batteries obtained from a traditional lithium strip through replenishment or without replenishment in Comparative Example 1 and Comparative Example 2 are 143.2 mAh/g and 135.5 mAh/g, respectively, the capacity retention rates after 2000 charge and discharge cycles are about 80%, and the capacity retention rates after 26 weeks of storage are smaller than 93.5%, indicating that the capacities and retention rates are significantly lower than those of the lithium-ion batteries provided in the embodiments of the present disclosure. Moreover, the first charge and discharge capacity of the lithium-ion battery without lithium replenishment is obviously smaller than that obtained with lithium replenishment.

TABLE 1

| | Test results of lithium-ion batteries | | |
| | First charge and discharge capacity (mAh/g) | Capacity retention rate after 2000 cycles (%) | Capacity retention rate after 26 weeks of storage (%) |
| --- | --- | --- | --- |
| Example 1 | 151.2 | 88.3 | 99.2 |
| Example 2 | 153.1 | 89.2 | 98.4 |
| Example 3 | 154.6 | 89.8 | 99.6 |
| Example 4 | 154.8 | 90.6 | 100.5 |
| Example 5 | 153.9 | 88.5 | 99.0 |
| Example 6 | 150.6 | 84.2 | 95.0 |
| Example 7 | 148.2 | 85.6 | 93.8 |
| Example 8 | 150.0 | 85.3 | 94.6 |
| Example 9 | 147.0 | 84.9 | 96.2 |
| Comparative Example 1 | 143.2 | 80.4 | 93.5 |
| Comparative Example 2 | 135.5 | 80.5 | 90.6 |

Figure 3:
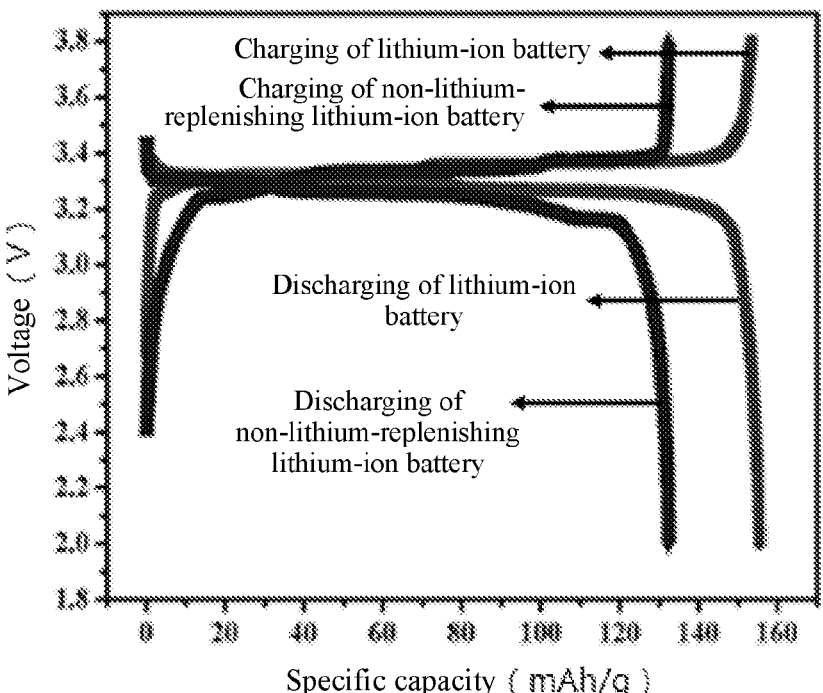
FIG. 3 is a diagram showing comparison of capacity test curves of a lithium-ion battery before and after lithium replenishment according to an embodiment of the present disclosure.
Figure 4:
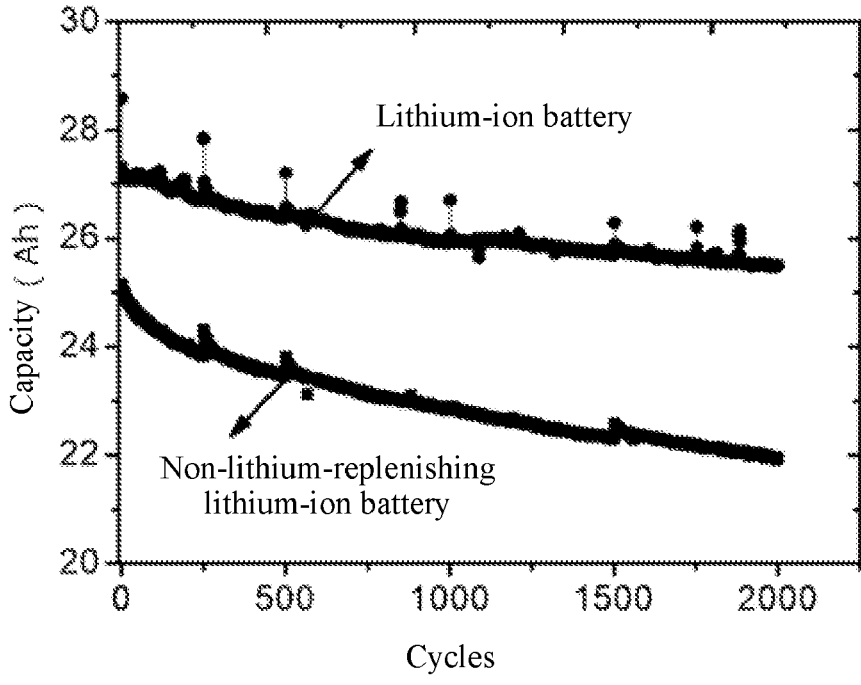
FIG. 4 is a diagram showing comparison of cycle test curves of a lithium-ion battery before and after lithium replenishment according to an embodiment of the present disclosure.

FIG. 3 and FIG. 4 are respectively diagrams showing comparison of capacity test curves and cycle test curves of the lithium-ion battery after lithium replenishment in Example 1 and the lithium-ion battery without lithium replenishment in Comparative Example 2. From FIG. 3 and FIG. 4 and the data in Table 1, it can be seen that the capacity of the lithium-ion battery 5 after lithium replenishment in Example 1 is increased by 12% compared with that of the lithium-ion battery without lithium replenishment in Comparative Example 2, and the cycle performance of the lithium-ion battery 5 after lithium replenishment is increased by 10%@2000 cycles compared with that of the lithium-ion battery before replenishment. The capacity of the lithium-ion battery 5 after lithium replenishment decreases by only 9.4% after 26 weeks of storage at room temperature.

Although the embodiments of the present disclosure have been described above in conjunction with the accompanying drawings, the present disclosure is not limited to the specific implementations described above, and the specific implementations described above are merely illustrative and not restrictive. Those having ordinary skill in the art can make various changes and modifications based on the teachings of the present disclosure without departing from the spirit of the present disclosure and the scope of the appended claims. Such changes and modifications also fall within the protection scope of the present disclosure.

What is claimed is:

1. An electrode plate, comprising:
a current collector layer;
a semiconductor layer, wherein the semiconductor layer is disposed on at least one surface of the current collector layer; and
an alkali metal replenishing layer, wherein the alkali metal replenishing layer is a lithium-replenishing agent layer or a sodium-replenishing agent layer, and the alkali metal replenishing layer is arranged on a surface of the semiconductor layer opposed to the surface of the semiconductor that is in contact with the current collector layer,
wherein the semiconductor layer is a thermo-sensitive semiconductor obtained from one or a plurality of oxides selected from $ZnO$, $CuO$, $NiO$, $Al_2O_3$, $Fe_2O_3$, $Mn_3O_4$, and $Co_3O_4$, wherein the semiconductor layer exhibits a higher electrical resistance at a lower temperature than at a higher temperature.

2. The electrode plate according to claim 1, wherein the alkali metal replenishing layer has a thickness of between 50 μm to 300 μm.

3. The electrode plate according to claim 1, wherein the alkali metal replenishing layer is the lithium-replenishing agent layer, and the lithium-replenishing agent layer is a negative electrode lithium-replenishing agent layer.

4. The electrode plate according to claim 3, wherein the negative electrode lithium-replenishing agent layer comprises at least one of metal lithium, lithium silicon alloy, lithium aluminum alloy, lithium boron alloy and lithium magnesium alloy.

5. The electrode plate according to claim 1, wherein the alkali metal replenishing layer is the lithium-replenishing agent layer, and the lithium-replenishing agent layer is a positive electrode lithium-replenishing agent layer.

6. The electrode plate according to claim 5, wherein the positive electrode lithium-replenishing agent layer comprises at least one of lithium oxide, lithium ferrite, lithium cobaltate and lithium nickel oxide.

7. The electrode plate according to claim 1, wherein the semiconductor layer has a surface resistance of between $10^{-3}$ mΩ·m² to $10^{5}$ mΩ·m².

8. The electrode plate according to claim 7, wherein the semiconductor layer has a thickness of between 100 nm to 500 nm.

9. A lithium-ion battery, comprising a positive electrode plate, a negative electrode plate and at least one electrode plate according to claim 1, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

10. The lithium-ion battery according to claim 9, the electrode plate is a negative electrode lithium-replenishing electrode plate, the electrode plate comprises a lithium-replenishing tab extending from the current collector layer, the negative electrode plate comprises a negative tab, and the lithium-replenishing tab is connected with the negative tab.

11. The lithium-ion battery according to claim 9, the electrode plate is a positive electrode lithium-replenishing electrode plate, the electrode plate comprises a lithium-replenishing tab extending from the current collector layer, the positive electrode plate comprises a positive tab, and the lithium-replenishing tab is connected with the positive tab.

12. A lithium-ion battery, comprising a positive electrode plate, a negative electrode plate and at least one electrode plate according to claim 2, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

13. A lithium-ion battery, comprising a positive electrode plate, a negative electrode plate and at least one electrode plate according to claim 3, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

14. A lithium-ion battery, comprising a positive electrode plate, a negative electrode plate and at least one electrode plate according to claim 4, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

15. A lithium-ion battery, comprising a positive electrode plate, a negative electrode plate and at least one electrode plate according to claim 5, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

16. A lithium-ion battery, comprising a positive electrode plate, a negative electrode plate and at least one electrode plate according to claim 6, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

17. A lithium-ion battery, comprising a positive electrode plate, a negative electrode plate and at least one electrode plate according to claim 7, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

18. A lithium-ion battery, comprising a positive electrode plate, a negative electrode plate and at least one electrode plate according to claim 8, wherein the alkali metal replenishing layer is a lithium-replenishing agent layer; and the positive electrode plate and the negative electrode plate are separated from each other by a separator, and the at least one electrode plate is separated from the positive electrode plate and/or the negative electrode plate by the separator.

19. The lithium-ion battery according to claim 18, the electrode plate is a negative electrode lithium-replenishing electrode plate, the electrode plate comprises a lithium-replenishing tab extending from the current collector layer, the negative electrode plate comprises a negative tab, and the lithium-replenishing tab is connected with the negative tab.

20. The lithium-ion battery according to claim 18, the electrode plate is a positive electrode lithium-replenishing electrode plate, the electrode plate comprises a lithium-replenishing tab extending from the current collector layer, the positive electrode plate comprises a positive tab, and the lithium-replenishing tab is connected with the positive tab.

* * * * *